United States Patent
Suzuki et al.

(10) Patent No.: US 8,573,709 B2
(45) Date of Patent: Nov. 5, 2013

(54) BRAKING CONTROL APPARATUS FOR ELECTRIC VEHICLE

(75) Inventors: Keisuke Suzuki, Kawasaki (JP); Jun Kubo, Hino (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 425 days.

(21) Appl. No.: 12/964,237

(22) Filed: Dec. 9, 2010

(65) Prior Publication Data
US 2011/0148184 A1 Jun. 23, 2011

(30) Foreign Application Priority Data
Dec. 18, 2009 (JP) ................................. 2009-287256

(51) Int. Cl.
*B60T 13/74* (2006.01)
(52) U.S. Cl.
USPC ................ 303/3; 303/20; 303/151; 303/152; 303/191; 903/947; 701/22; 701/70; 701/71; 477/4
(58) Field of Classification Search
USPC ........................ 303/3, 20, 151, 152, 191, 199; 180/65.1; 903/947; 701/22, 70, 71; 477/4
See application file for complete search history.

(56) References Cited

U.S. PATENT DOCUMENTS

| 4,335,337 | A | * | 6/1982 | Okamatsu et al. | ............... 318/52 |
|---|---|---|---|---|---|
| 5,472,265 | A | * | 12/1995 | Ohnuma | ........................... 303/3 |
| 5,615,933 | A | * | 4/1997 | Kidston et al. | ................ 303/152 |
| 6,196,345 | B1 | * | 3/2001 | Lyons et al. | ................. 180/65.8 |
| 6,488,344 | B2 | * | 12/2002 | Huls et al. | ..................... 303/152 |
| 7,024,290 | B2 | * | 4/2006 | Zhao et al. | ....................... 701/22 |
| 7,380,890 | B2 | * | 6/2008 | Tobler et al. | .................. 303/176 |
| 7,577,510 | B2 | * | 8/2009 | Fodor et al. | ..................... 701/82 |
| 8,078,348 | B2 | * | 12/2011 | Saitoh et al. | ..................... 701/22 |
| 2001/0020789 | A1 | * | 9/2001 | Nakashima | ................. 290/40 C |
| 2006/0047400 | A1 | * | 3/2006 | Prakash et al. | .................. 701/70 |
| 2010/0113214 | A1 | * | 5/2010 | Krueger et al. | ................. 477/28 |

FOREIGN PATENT DOCUMENTS

JP 3438242 B2 6/2003

* cited by examiner

*Primary Examiner* — Thomas J Williams
*Assistant Examiner* — Mariano Sy
(74) *Attorney, Agent, or Firm* — Foley & Lardner LLP

(57) ABSTRACT

In a braking control apparatus for an electric vehicle, a target braking torque command value calculation section calculates a target braking torque command value on a basis of at least one of a state of road wheels and a braking request by a vehicle driver, a frequency component decomposition section decomposes a target braking torque command value into a first frequency component lower than a resonance frequency of a drive train and a second frequency component equal to or higher than the first frequency component, and a braking force control section provides an electrical braking torque for road wheels on a basis of a motor torque command value corresponding to the first frequency component and provides a frictional braking torque for the road wheels on a basis of a frictional braking torque command value corresponding to the second frequency component.

20 Claims, 9 Drawing Sheets

US 8,573,709 B2

BRAKING CONTROL APPARATUS FOR ELECTRIC VEHICLE

BACKGROUND OF THE INVENTION (1) Field of the Invention

The present invention relates to a vehicular braking control apparatus which is capable of providing a braking torque for road wheels by means of at least one electric motor.

(2) Description of Related Art

An electric vehicle (or an electric automotive vehicle) is known which is equipped with both of electrical braking means for varying a regenerative driving force on a basis of a magnitude of a depression force imposed on a brake pedal by a vehicle driver and hydraulic pressure braking means for varying a hydraulic pressure braking force on a basis of the magnitude of the depression force imposed on the driver. In such an electric vehicle as described above, an antilock control apparatus for the electric vehicle prevents a lock of the road wheels by means of one of the braking means from among the hydraulic pressure braking means and the electrical braking means corresponding to a lock state of the road wheels under the braking.

A Japanese Patent No. 3438242 issued on Jun. 3, 2003 exemplifies a previously proposed braking control apparatus for the electric vehicle in which, when the antilock control is started which prevents the lock of the road wheels by means of one of the braking means from one of the electric braking means and the hydraulic pressure braking means, the braking force based on a magnitude of a pedal depression by means of the other braking means (means which does not effect the antilock control) is progressively decreased to make zero.

SUMMARY OF THE INVENTION

In the previously proposed braking control apparatus described in the above-identified Japanese Patent, in a case where, for example, the antilock control is effected by the hydraulic pressure braking means and the braking force of the electrical braking means is decreased to make zero, the braking force that the antilock control is requesting is needed to be wholly satisfied with the hydraulic pressure braking means. Consequently, noises and vibrations are developed when the hydraulic pressure is controlled and there is a possibility that a silence characteristic that the electrical braking means has is not revived. On the other hand, in a case where the antilock control is effected by the electrical braking means and the braking force of the hydraulic pressure braking means is progressively reduced to make zero, vibrations in a drive line extended from a motor output axle to a wheel axle of each of the road wheels is developed and there is a possibility that the silence characteristic of the antilock control is reduced.

It is, therefore, an object of the present invention to provide a braking control apparatus for an electric vehicle which is capable of improving the silence characteristic when the antilock control is effected by electrical braking means or the hydraulic pressure control means.

In order to achieve the above-described object, in the braking control apparatus for the electric vehicle according to the present invention, a target braking torque is decomposed into a first frequency component which does not include a resonance frequency of a drive train and a second frequency component which includes the resonance frequency of the drive train, an electric motor control which provides an electrical braking torque according to the first frequency component is effected, and a frictional braking device which provides a frictional braking torque for the road wheels according to a second frequency component is operated.

Thus, since the braking force by means of the electric motor can be used at a frequency equal to or below the resonance frequency of the drive train, the silence characteristic can be improved.

DETAILED DESCRIPTION OF THE INVENTION

Figure 1:
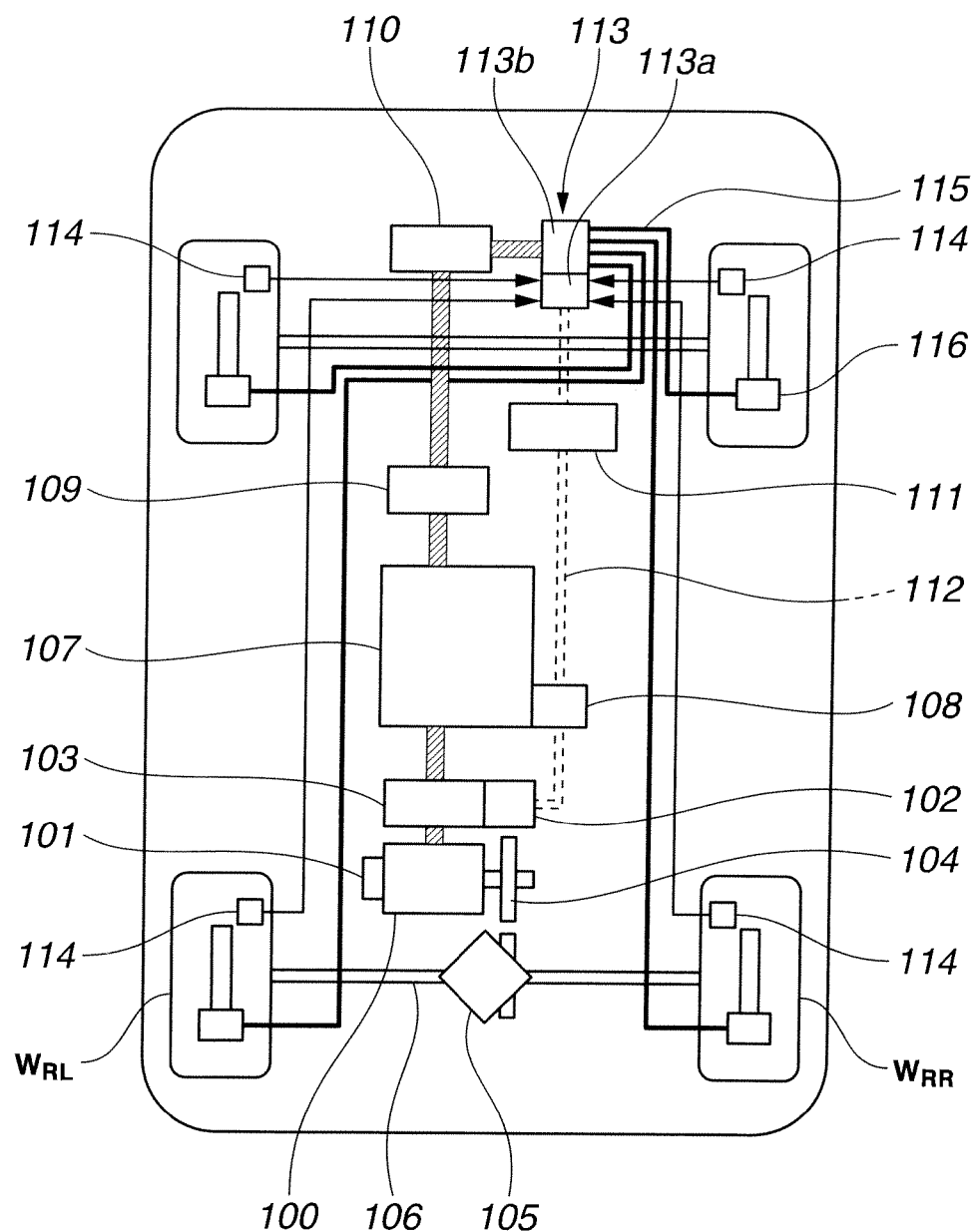
FIG. 1 is a rough configuration view representing a structure of an electric vehicle (an electric motor drive vehicle) to which a braking control apparatus in a preferred embodiment according to the present invention is applicable.

FIG. 1 is a rough configuration view representing a structure of an electric motor drive vehicle (also called, an electric vehicle) to which a braking control apparatus in a preferred embodiment according to the present invention is applicable. It should be noted that a torque to brake the vehicle when the vehicle is forwarding in the preferred embodiment is assumed to be positive. An electric motor 100 is provided which can generate a positive-or-negative torque in the electric motor drive vehicle. Electric motor 100 is connected to a resolver 101 as a revolution sensor. A motor controller 102 outputs a drive signal to an inverter 103 by referring to an information of the revolution sensor. Inverter 103 controls a motor torque by supplying an electric current to electric motor 100. A motor winding temperature sensor is installed on electric motor 100 which detects a temperature of a coil (motor winding) of electric motor 100. In addition, an inverter element temperature sensor to detect an element of inverter 103 arranged within inverter 103 is installed in inverter 103.

An output axle of electric motor 100 is connected to a speed reducing unit 104 to transmit the torque to a wheel axle 106 via a differential gear 105. An electric power driving electric motor 100 is supplied from a high-voltage battery 107. In addition, a charge state (a, so-called, State Of Charge and abbreviated as SOC) and a magnitude of a heat generation of high-voltage battery 107 are monitored by a battery controller 108. High-voltage battery 107 is connected to a DC-DC converter 109 so that the voltage is dropped (stepdown) by means of DC-DC converter 109 to be enabled to charge a low-voltage battery 110.

A vehicle controller 111 monitors a depression force or a stroke of each of a brake pedal and an accelerator pedal.

Vehicle controller 111 transmits a positive or negative torque command to a braking controller 113 via an in-vehicle communication line 112 according to a magnitude of the depression of the brake pedal and the accelerator pedal.

Braking controller 113 includes: a control unit 113a which calculates torque control contents of a drive slip prevention control (TCS control) and a braking slip prevention control (ABS control) from a sensor signal of a wheel speed sensor 114 installed for each of road wheels and an information on the motor torque outputted by motor controller 102; and a liquid pressure control actuator 113b having a housing in which a pump and an electromagnetic valve are installed and which generates a frictional braking torque in accordance with a command signal of control unit 113a. In a case where braking controller 113 controls the frictional braking torque, braking controller 113 operates the pump within braking controller 113 in accordance with the depression force of the brake pedal by the vehicle driver, opens and closes the corresponding electromagnetic valve, and supplies the brake liquid to a brake caliper 116 via a hydraulic pressure piping 115 to generate the braking torque. (These liquid pressure control actuator 113b, hydraulic pressure piping 115, and brake caliper 116 are generally referred to as a frictional braking device). In a case where braking control device 113 controls the motor torque, a torque command is transmitted to motor controller 102 via in-vehicle communication line 112 so that electric motor 100 generates a braking torque.

Figure 2:
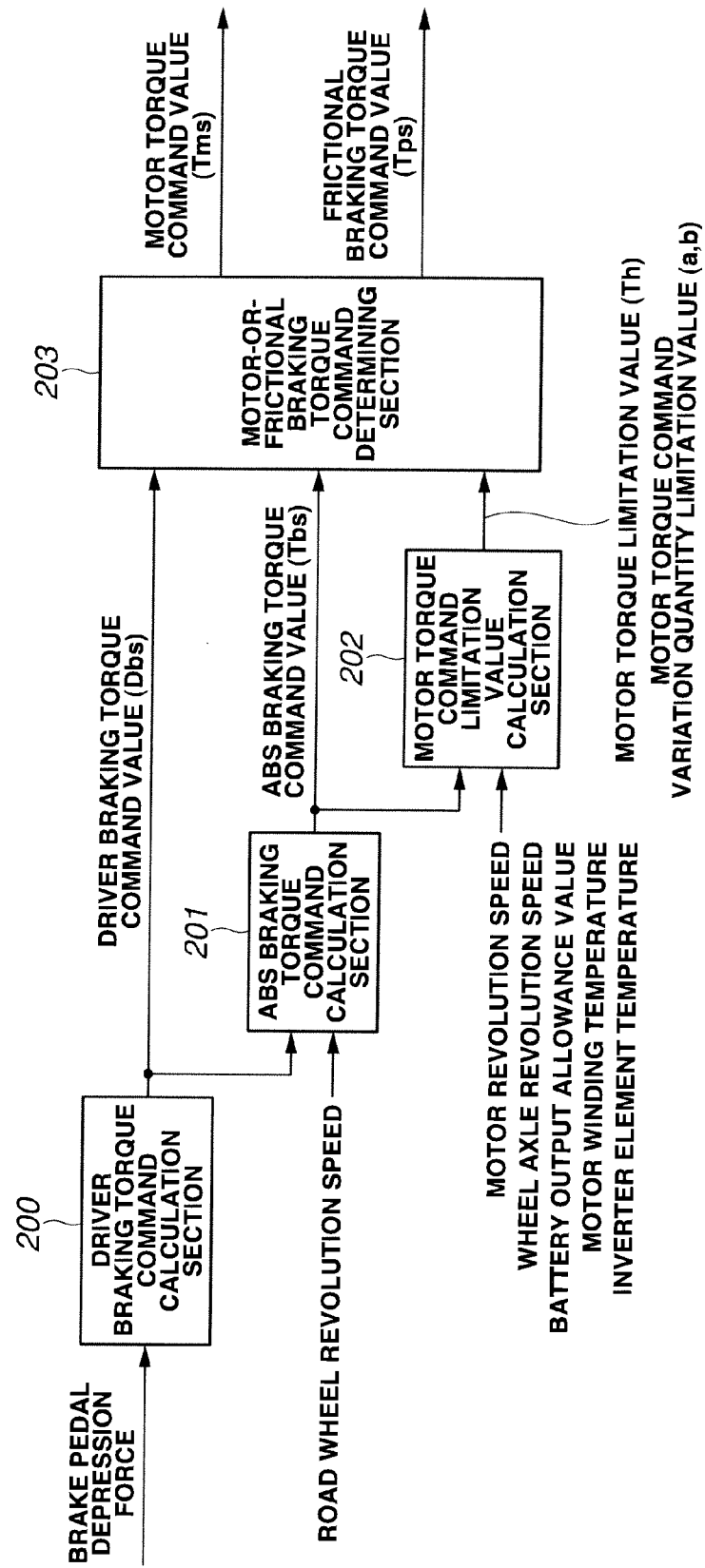
FIG. 2 is a control block diagram representing a structure of the braking control apparatus for the electric motor drive vehicle (electric vehicle) in the preferred embodiment according to the present invention.

FIG. 2 shows a control block diagram representing a structure of the braking control apparatus for the electric motor drive vehicle in the embodiment shown in FIG. 1. This braking control apparatus shown in FIG. 2 includes: a driver braking torque command calculation section 200; an ABS braking torque command calculation section 201; a motor torque command limitation value calculation section 202; and a motor-or-frictional braking torque command value determining section (this corresponds to a target braking torque command value calculation section).

It should be noted that, in this control structure, driver braking torque command calculation section 200 is installed within vehicle controller 111, ABS braking torque command calculation section 201, motor torque command limitation value calculation section 202, motor-or-frictional braking torque command determining section 203 are installed within control unit 113a. Each of these calculation sections and the determining section may be installed within another controller and a specific limitation of their installation sections (installation locations) is not placed.

Figure 3A:
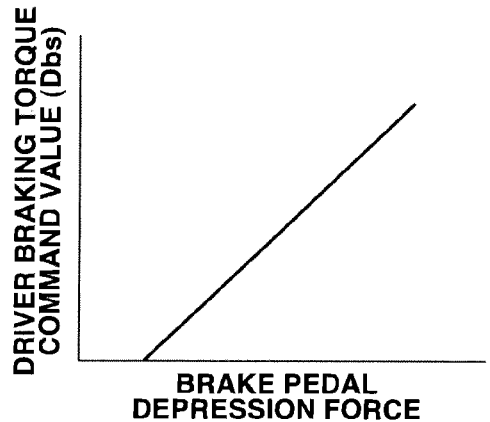
FIGS. 3A and 3B are maps respectively representing a relationship between a brake pedal manipulated variable and a driver braking torque command value in the preferred embodiment.
Figure 3B:
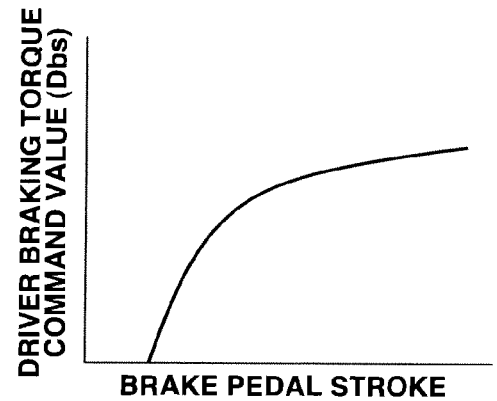

Driver braking torque command calculation section 200 calculates a braking torque command (Dbs) from a driver's depression force or a stroke signal on the brake pedal. FIGS. 3A and 3B are maps representing the relationship between a brake pedal manipulated variable and driver braking torque command value (Dbs) in the preferred embodiment. FIG. 3A shows the relationship of the driver braking torque command value with respect to the brake pedal depression force. The driver braking torque command value (Dbs) is set to zero (0) as a play from zero to a predetermined value of the brake pedal depression force and, thereafter, as the depression force becomes larger, the larger braking torque command value (Dbs) is outputted. FIG. 3B shows the relationship of the driver braking torque command value (Dbs) with respect to the brake pedal stroke. As the brake pedal stroke quantity is from zero (0) to a predetermined value of the brake pedal stroke, the command value (Dbs) is set to zero (0) as the same play and, thereafter, as the stroke quantity becomes larger, the braking torque command value (Dbs) is outputted which increases in a convex shape as shown in FIG. 3B. The characteristics of the command value (Dbs) with respect to the brake pedal depression force and with respect to the brake pedal stroke may use both of the characteristics shown in FIGS. 3A and 3B or may use either of the characteristics shown in FIGS. 3A and 3B. A specific limitation is not placed on the characteristics.

ABS braking torque command calculation section 201 calculates a braking torque command value (Tbs) in order for each road wheel speed to be coincident with a target road wheel speed in accordance with a slip state of a corresponding one of the road wheels detected by the corresponding one of wheel speed sensors 114 within a range with the driver braking torque command value calculated by driver driving torque command calculation section 200 as an upper limit thereof.

It should herein be noted that, since the ABS control basically performs a control over a slip rate for each of the road wheels, the braking torque command is calculated for each corresponding one of the road wheels. However, in a case where a specific state is detected, a variation in the braking torque command of each of rear left and right road wheels is assumed to be the same. This specific state means a state in which a vehicle stability is reduced, for example, the vehicle runs on a μ split road or extremely low μ road (μ means a frictional coefficient of a road on which the vehicle runs).

Motor torque command limitation value calculation section 202 calculates limitation values of a motor torque command value and of a motor torque command variation quantity, respectively.

Figure 4:
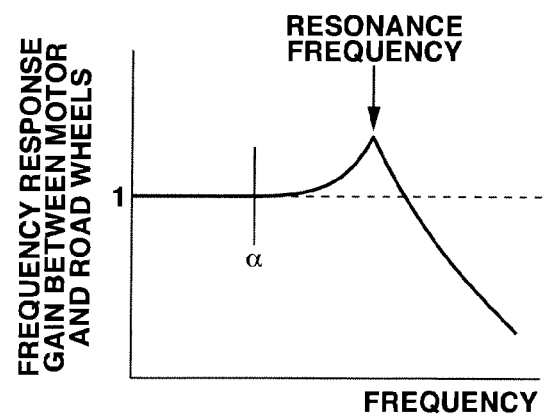
FIG. 4 is a characteristic graph representing a motor-road wheel frequency response gain between an electric motor and a drive road wheel with respect to a motor revolution speed (a frequency).

FIG. 4 shows a characteristic graph representing a frequency response gain between the electric motor and the road wheels with respect to a frequency (namely, a revolution speed of electric motor 100).

The limitation value (a, b) of the motor torque command variation quantity is determined so that the motor torque is varied according to a component equal to or lower than a frequency in which a magnitude of the revolution speed of one of the road wheels with respect to the motor revolution speed frequency shown in FIG. 4, in other words, equal to or below a frequency (α in FIG. 4) not including the resonance frequency of the drive train. That is to say, is motor torque command limitation value calculation section 202 corresponds to a frequency component decomposition section. As far as a first frequency component is concerned, the first frequency component is achieved by the motor torque and the second frequency component is achieved by the frictional braking torque.

Suppose that the torque command is outputted at a frequency placed in proximity to the resonance frequency using electric motor 100. At this time, a movement of actual road wheels cannot follow an operation of electric motor 100. Thus, a vibrative twist on a shaft between electric motor 100 and the road wheels occurs. This twist causes a source of abnormal sound. On the other hand, since the torque is provided for a brake rotor integrally attached onto each of the road wheels in a case of the frictional braking device, such a problem as the twist on the shaft does not occur.

FIG. 4 shows the frequency response gain between the motor and road wheels empirically or using a mathematical model. For example, when the frequency at which the response of the road wheels is largest is 5 Hz, the motor torque command variation quantity is set for the frequency of the torque command to be 2 Hz or below (=α). The frequency component equal to or below α Hz is defined as the first frequency component and that higher than α Hz is defined as the second frequency component. Then, it will be appreciated that the first frequency component is the frequency component not including the resonance frequency of the drive train and the second frequency component is the frequency component including the resonance frequency of the drive train.

Limitation values (Th) of the motor torque command are calculated from a battery output allowance value, a motor winding temperature, and an inverter element temperature, respectively. A minimum value from among these calculated limitation values is set as a final limitation value (Th) of the motor torque command.

Figure 5:
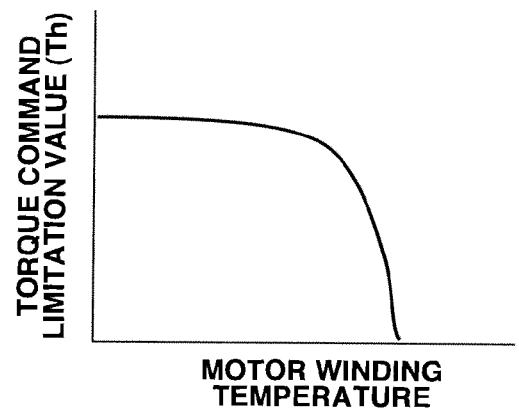
FIG. 5 is a characteristic graph representing a relationship between motor winding (coil) temperature and a torque command limitation value in a case of the preferred embodiment.
Figure 6:
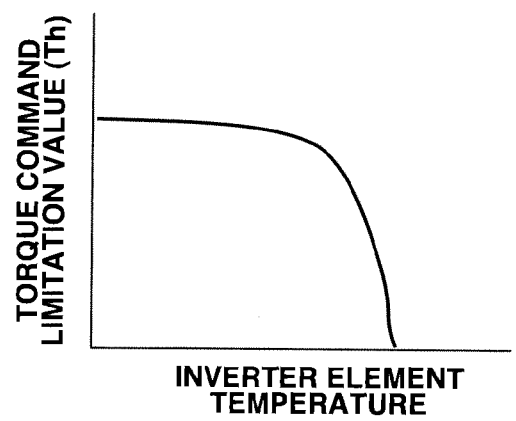
FIG. 6 is a characteristic graph representing a relationship between an inverter element temperature and the torque command limitation value in the ca of the preferred embodiment.

FIG. 5 shows a relationship between the motor winding temperature and the torque command limitation value (Th) in the preferred embodiment. FIG. 6 shows a relationship between the inverter element temperature and the torque command limitation value (Th) in the preferred embodiment.

The battery output allowance value is outputted from battery controller 108 and is determined according to the battery state (the degree of the temperature and the charge). The torque achievable in a range that can be outputted by high-voltage battery 107 is set to the motor torque command limitation value (Th). Next, the torque limitation values are obtained from the maps shown in FIGS. 5 and 6 according to the motor winding temperature and the inverter element temperature. The torque value that can be reduced for a time (for example, 30 msec) allowing for the reduction in the braking torque that the ABS control is requesting to zero using above-described torque command variation quantity limitation value (a, b) is set as the torque command limitation value.

Motor-or-frictional braking torque command determining section 203 determines the motor torque command value (Tms) limited by the calculated limitation value in ABS braking torque command calculation section 201 and sets a difference between the ABS braking torque command value (Tbs) and the motor torque command value (Tms) as a frictional braking torque command value (Tps).

Figure 7:
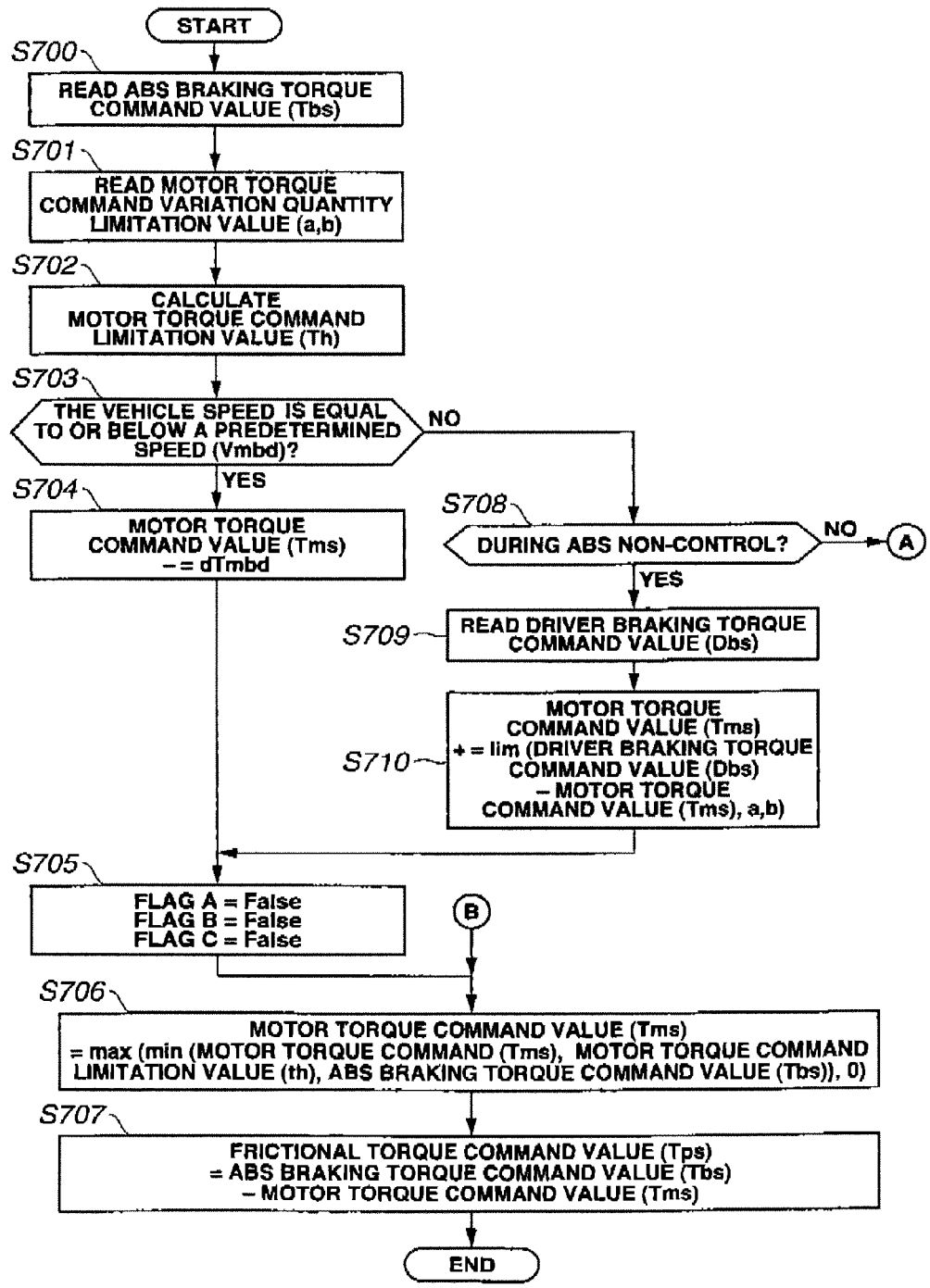
FIGS. 7 and 8 are integrally a flowchart representing process contents of a motor frictional braking torque command determining section in the preferred embodiment.
Figure 8:
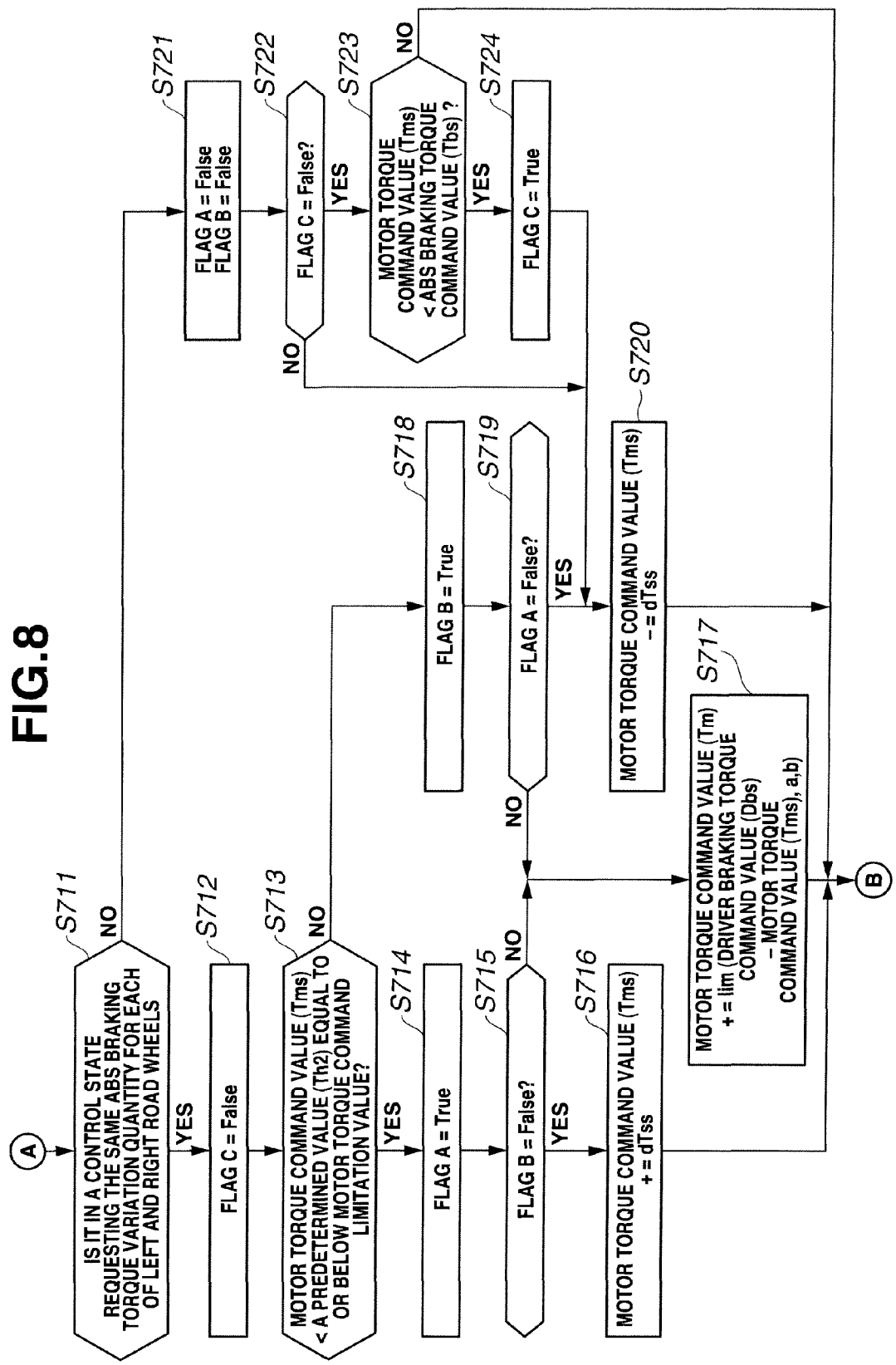

FIGS. 7 and 8 are integrally a flowchart representing processing contents of motor frictional braking torque command determining section 203. At a step S700, braking controller 113 (or motor frictional braking command determining section 203 (control unit 113a)) reads ABS braking torque command value (Tbs) calculated by ABS braking torque command calculation section shown by 201 in FIG. 2.

At a step S701, braking controller 113 (or control unit 113a but, hereinafter, braking controller 113 is used) reads motor torque command variation quantity limitation value (a, b) shown by 201 in FIG. 2.

At a step S702, braking controller 113 calculates motor torque command limitation value (Th).

[A Case where the Motor Torque is Decreased According to a Low Vehicle Speed Determination]

At a step S703, braking controller 113 determines whether the vehicle speed (vehicle body speed) is equal to or below a predetermined value (Vmbd). The predetermined vehicle speed (Vmbd) which provides a threshold value is set to be higher than a vehicle speed at which the braking by means of electric motor 100 becomes difficult. If the vehicle speed is equal to or below the predetermined value (Vmbd), the routine goes to a step S704. At step S704, motor torque command value (Tms) is decreased from the motor torque command. It should be noted that the calculation of the decreased motor torque command value will be described later.

At a step S705, all of flags FLAG A, FLAG B, and FLAG C required for the calculation of the motor torque command value during the ABS control are set to false.

At a step S706, motor torque command value (Tms) updated at step S703 is limited by ABS braking torque command value (Tbs) read at step S700 and motor torque command limitation value (Th) read at step S702.

At a step S707, braking controller 113 sets the difference between ABS braking torque command value (Tbs) read at step S703 and motor torque command value (Tms) calculated at step S706 as the frictional braking torque command value.

[A Case of ABS Non-Control]

If the determination of step S703 is No, namely, if the vehicle speed is higher than the predetermined value (Vmbd), the routine goes to a step S708. At step S708, braking controller 113 determines whether the vehicle is in the ABS non-control. If the vehicle is in the ABS non-control (Yes) at step S708, the routine goes to a step S709. At step S709, braking controller 113 reads the driver braking torque command value (Dbs) calculated by driver braking torque command value calculation section 200 (refer to FIG. 2).

Next, at a step S710, a difference between driver braking torque command value (Dbs) and motor torque command value (Tms) which is limited by the motor torque command variation quantity limitation value (a, b) is added to the motor torque command value (Tms) to update motor torque command value (Tms). This is a process in which the motor torque command value (Tms) approaches to the driver braking torque command value (Dbs) by the torque variation quantity within motor torque command variation quantity limitation value (a, b). Thereafter, the routine goes to step S705. Thereafter, the process is the same as in the case of Yes at step S703.

[When the Vehicle is in a Control State in which the Same ABS Braking Torque Variation Quantity Request for Each of the Road Wheels is Made]

If the determination of step S708 is No, namely, if the vehicle is in the ABS control, the routine goes to a step S711 (refer to FIG. 8). At step S711, braking controller 113 determines whether the vehicle is in the control state in which the ABS braking torque command variation quantity is the same for each of the left and right road wheels. If the determination at step S711 is Yes, the routine goes to a step S712. At step S712, FLAG C is set to false.

At the next step S713, braking controller 113 determines whether the motor torque command value (Tms) is smaller than a predetermined value (Th2) equal to or below the motor torque command limitation value (Th) read at step S702. The predetermined value (Th2) is, for example, 50% the motor torque command limitation value (Th).

If the determination at step S713 is Yes, the routine goes to a step S714. At step S714, braking controller 113 sets FLAG A to True. At step S715, braking controller 113 determines whether FLAG B is false. If false at step S715 (Yes), the routine goes to a step S716. At step S716, braking controller 113 adds a predetermined value (dTss) to the motor torque command value (Tms). It should be noted that the added torque variation quantity is equal to or below the motor torque command variation quantity limitation value (a, b) and is determined so as not to generate the variation in the total braking force which totals the motor and frictional braking torques with controllabilities of the respective motor control and frictional control taken into consideration. Thereafter, the routine goes to a step S706. Thereafter, the processing is advanced in the same way as the case of the ABS non-control.

If FLAG B is set to true (No) at step S715, the routine goes to a step S717. At step S717, a value of the ABS braking torque command variation quantity (dTbs) limited by the motor torque command variation quantity limitation value (a, b) is added to the motor torque command value (Tms) to update the motor torque command value (Tms). Thereafter, the routine goes to step S706 (refer to FIG. 7) and the same processing in the case where FLAG B is set to false at step S715 is repeated.

If the determination at step S713 is No, namely, if the motor torque command value (Tms) is equal to or larger than a predetermined value (Th2) which is equal to or below the motor torque command limitation value (Th), the routine goes to a step S718 in which FLAG B is set to true.

At the next step S719, braking controller 13 determines whether FLAG A is set to false.

If Yes at step S719, the routine goes to a step S720. At step S720, a predetermined value (dTss) is subtracted from the motor torque command value (Tms). Thereafter, the routine goes to step S706. The same processing is repeated in the case where the determination at step S713 is Yes. If the determination at step S713 is No, namely, FLAG A is set to true, the routine goes to step S717 and, thereafter, the same processing in a case where the determination at step S715 is Yes is repeated.

As described above, functions of FLAG A and FLAG B cause the vehicle to be in the control state in which the same ABS braking torque command variation quantity is obtained for each of the left and right road wheels. The braking torque command value is increased in accordance with the contents of step S716 until the determination at step S713 is No if the determination at step S713 is, at first, Yes. Then, the braking torque command value is decreased in accordance with the contents of step S720 until the determination at step S713 is Yes if the determination of step S713 is No. Hence, in the control state in which the variation quantity of the ABS braking torque command (Tbs) is satisfied by the motor torque command, it becomes possible to control the motor torque from either torque zero or the braking torque command limitation value (Tbs) with a great margin.

[When the Vehicle is in the Control State in which the Different ABS Braking Torque Variation Quantity Requests are Made for the Respective Two Road Wheels]

If the determination at step S711 is No (refer to FIG. 8), namely, if the vehicle is in the control state in which the ABS braking torque command variation quantity for each of the left and right road wheels is calculated independently of each other, the routine goes to a step S721 in which FLAG A and FLAG B are set to false. Next, the routine goes to a step S722 in which braking controller 113 determines whether FLAG C is set to false. If FLAG C is set to false (Yes) at step S722, the routine goes to a step S723. At step S723, braking controller 113 determines whether the motor torque command value (Tms) is equal to or below the ABS braking torque command value (Tbs) by a predetermined value or equal to or below the ABS braking torque command value (Tbs) by the predetermined value. If, at step S723, Yes, braking controller 113 sets FLAG C to true at step S724. Furthermore, the routine goes to step S720 to update the motor torque command value (Tms). If FLAG C is set to true at step S722, in other words, when the Yes determination at step S723 has only once experienced since the vehicle has been in the control state in which the different ABS braking torque command variation quantities for the respective road wheels are resulted, the determination at step S723 is skipped and the routine goes to step S720.

If the determination at step S723 is No, namely, if the motor torque command value (Tms) is larger than the ABS braking torque command value (Tbs) or larger than a value smaller than the ABS braking torque command value (Tbs) by a predetermined value, the routine goes to a step S706 without modification of the motor torque command.

As described above, the operation of FLAG C causes the vehicle to be in the control state in which the ABS braking torque command variation quantity is different for each of the left and right road wheels. In this control state, if the motor torque command value (Tms) becomes equal to or below the ABS braking torque command value (Tbs) or a value smaller than the ABS braking torque command value (Tbs) by the predetermined value, the motor torque command value (Tms) is continued to be decreased in accordance with step S720. Thus, motor torque command value (Tms) is held during no necessity of decreasing the motor torque command value (Tms) (No at step S723). If the decrease of the motor torque command value (Tms) is needed, the motor torque command value (Tms) is at once reduced until it becomes zero and, thereafter, a simultaneous variation of the motor and frictional braking torques can be eliminated.

Next, an operation example of flowchart shown in FIGS. 7 and 8 will be described with reference to timing charts of FIGS. 9 through 11.

Figure 9:
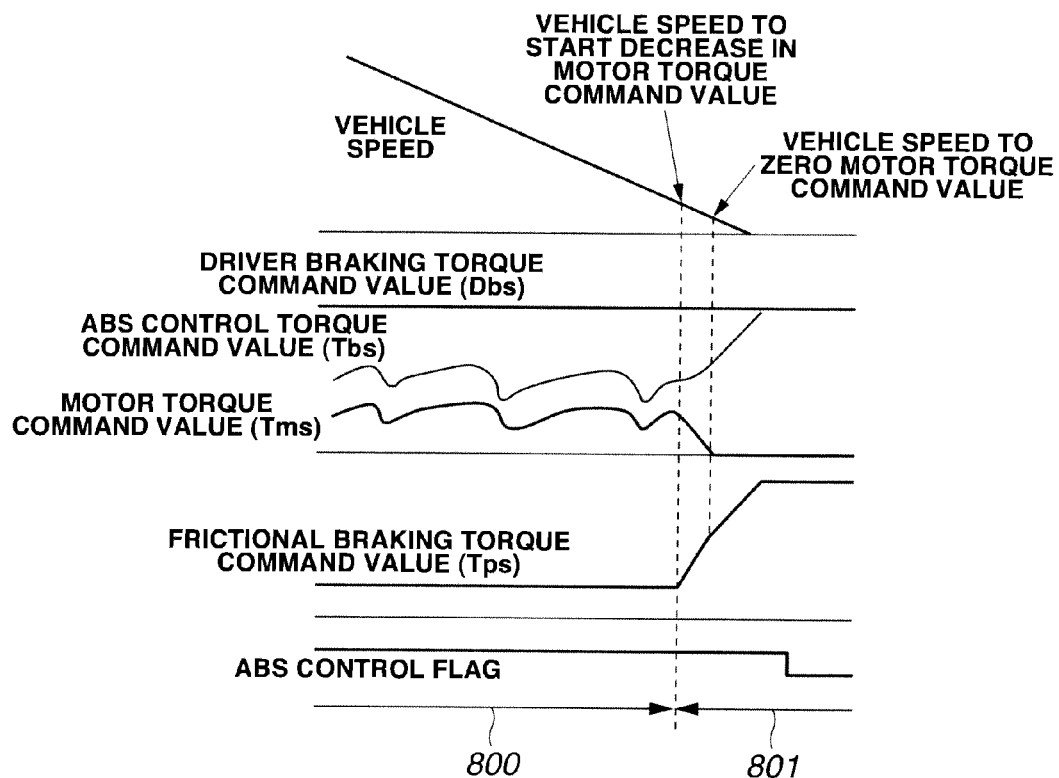
FIG. 9 is a timing chart representing an operation example when a low vehicle speed is determined and a motor torque is reduced.

FIG. 9 shows a timing chart representing the operation example when the motor torque is decreased (at step S704 in FIG. 7) upon the determination that the vehicle speed is lower than the predetermined speed (at step S703 in FIG. 7) in the preferred embodiment. A reference numeral 800 denotes a region in which the vehicle is in the control state in which the same braking torque command variation quantity for each of the left and right road wheels under the ABS control (at step S708 in FIG. 7, No determination is made).

In a region 801, the ABS control decreases the motor braking torque at the same time when the low vehicle speed is detected and the ABS control enters a torque increase state in order for the braking torque to be coincident with the driver braking torque command value (Dbs). It should, herein, be noted that a motor torque command decrease quantity is set for the motor torque to be zero until the vehicle speed becomes a vehicle speed value at which the braking by means of electric motor 100 becomes difficult. In other words, a time required for the vehicle speed to reach to the vehicle speed at which the braking by means of electric motor 100 becomes difficult is predicted from the present vehicle speed and from the vehicle deceleration. Then, the motor torque command value (Tms) to be decreased per unit time by dividing the present motor torque command value (Tms) by the predicted time. The frictional braking torque is outputted to compensate for the difference between the ABS control torque command value and the motor torque command value in accordance with step S707 in FIG. 7.

Figure 10:
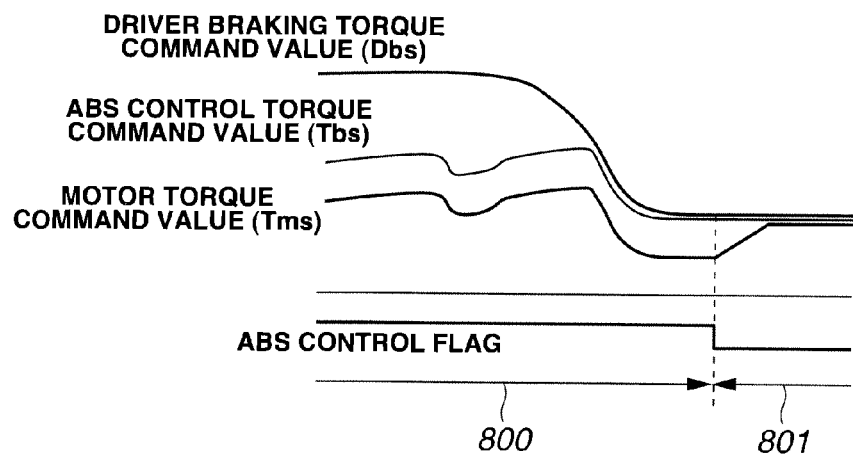
FIG. 10 is a timing chart representing an operation example when an ABS (Antilock Braking System) control is ended with a depression force by a vehicle driver reduced in the case of the preferred embodiment.

FIG. 10 shows a timing chart representing an operation example when the ABS control is ended with the depression force of the brake pedal reduced by the driver. A region 900 indicates a case where the driver braking torque command value (Dbs) is reduced and becomes equal to or below the ABS braking torque command value (Tbs). The ABS braking torque command value (Tbs) is similarly reduced since the driver braking torque command value (Dbs) is the upper limit value. At this time, since motor torque command value (Tms) is controlled in order for the frictional braking torque control means to be operated by reducing the motor torque in accordance with the reduction in the torque. However, the ABS control state is released after a predetermined time from a time at which the ABS braking torque command value (Tbs) is made coincident with the driver braking torque command value (Dbs) (a region 901). At this time, the motor torque is varied so as not to be coincident with the driver braking torque command value (Dbs) in accordance with step S710 of FIG. 7.

Figure 11:
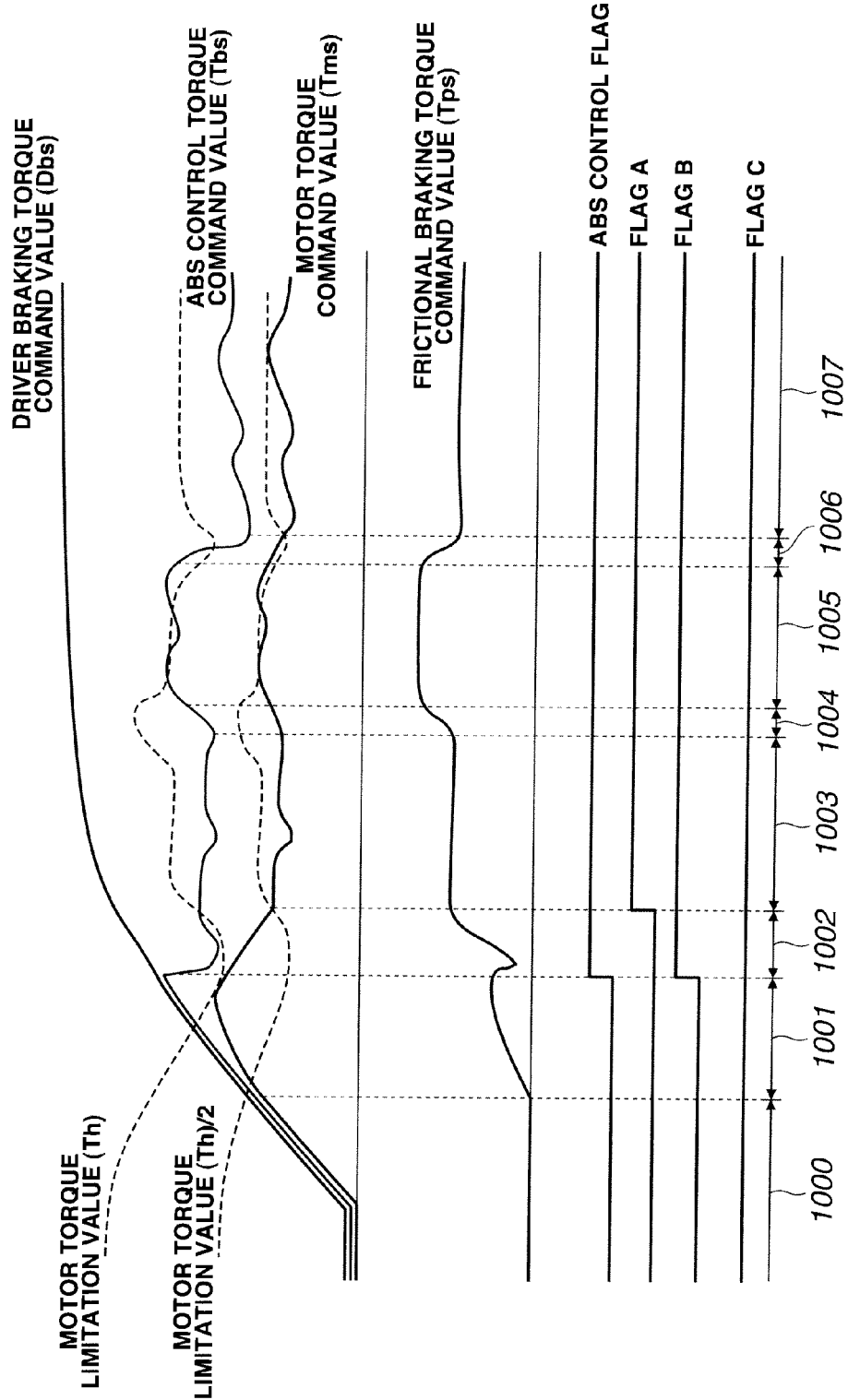
FIG. 11 is a timing chart representing an operation example in a state in which the ABS control requests the same braking torque variation quantity for each of a pair of drive road wheels in the case of the preferred embodiment.

FIG. 11 shows a timing chart representing an operation example of a state in which the ABS control is requesting the same braking torque variation quantity for each of the left and right road wheels in the preferred embodiment. When the vehicle is traveling on an icy or snowy road, it is known that the same state for each of the left and right road wheels can improve a vehicle stability rather than the individual controls for the respective left and right road wheels. In such a case as described above, the ABS control is executed.

A region 1000 indicates the ABS non-control. In region 1000, the variation quantity of driver braking torque command value (Dbs) is equal to or below the motor torque command variation quantity limitation value (a, b), the driver braking torque command value (Dbs), the ABS braking torque command value (Tbs), and the motor torque command value (Tms) are made coincident with each other.

In a region 1001, an increase in the motor torque command value (Tms) is limited due to a limitation value (a, b) of the driver braking torque variation quantity calculated at motor torque command limitation value calculation section 202 in FIG. 2. The difference from the ABS braking torque command value (Tbs) provides the frictional braking torque command value.

In a region 1002, the ABS control is started (the ABS control flag is set to true) and the ABS braking torque command value (Tbs) is decreased. At this time, since motor torque command value (Tms) is larger than the predetermined value (Th2) which is equal to or lower than the motor torque command limitation value (Th). Thus, the motor torque command is decreased in accordance with step S720 in FIG. 8.

The decrease in the motor torque command is carried out until it becomes the predetermined value (Th2) equal to or below the motor torque command limitation value (Th). This is because, if the motor torque command is placed in the proximity to limitation value (Th), motor torque control means cannot respond to the increase request of the braking torque in the thereafter ABS control. Under such a state as described above, a frequency of operation in the frictional braking device is increased so that noises and vibrations are generated.

In a region 1003, the ABS braking torque command variation quantity is satisfied according to the modification of the motor torque. Thus, it is not necessary to operate the frictional braking device and the noises and the vibrations which are developed when the frictional braking device is operated.

In a region 1004, the ABS braking torque command variation quantity (dTbs) is limited to limitation value (a, b) of the motor torque command variation quantity calculated at motor torque command limitation value calculation section 202 in FIG. 2 so that the frictional braking torque is increased to compensate for the insufficient quantity for the ABS braking torque command variation quantity (dTbs). The large ABS braking torque command variation quantity (dTbs) is generated in this region. The vehicular braking torque is largely varied. Thus, the noises and vibrations generated when the frictional braking device is operated in order for the frictional braking device to be compensated for the limitation of the motor torque command are allowed.

Since, in a region 1005, the ABS braking torque command variation quantity (dTbs) is reduced and becomes equal to or below the limitation value (a, b) of the motor torque command variation quantity, the ABS braking torque variation quantity (dTbs) is satisfied according to the modification of the motor torque in the same way as region 1003.

In a region 1006, the ABS braking torque command variation quantity (dTbs) is limited by the limitation value (a, b) of the motor torque command variation quantity and the frictional braking torque command value is reduced to compensate for the insufficient quantity of the ABS braking torque command value (Tbs).

In a region 1007, the ABS braking torque command variation quantity (dTbs) is again satisfied according to the modification of the motor torque in the same way as region 1003 and region 1005.

Since, in a region not requiring the large braking torque variation quantity due to the road surface change by operating the motor braking torque control means and the frictional braking torque control means, only the motor torque satisfies the ABS braking torque command variation quantity (dTbs) so that it becomes possible to reduce the frequency that the frictional braking device has operated. Thus, the generation frequency of the noises and the vibrations becomes reduced.

Figure 12:
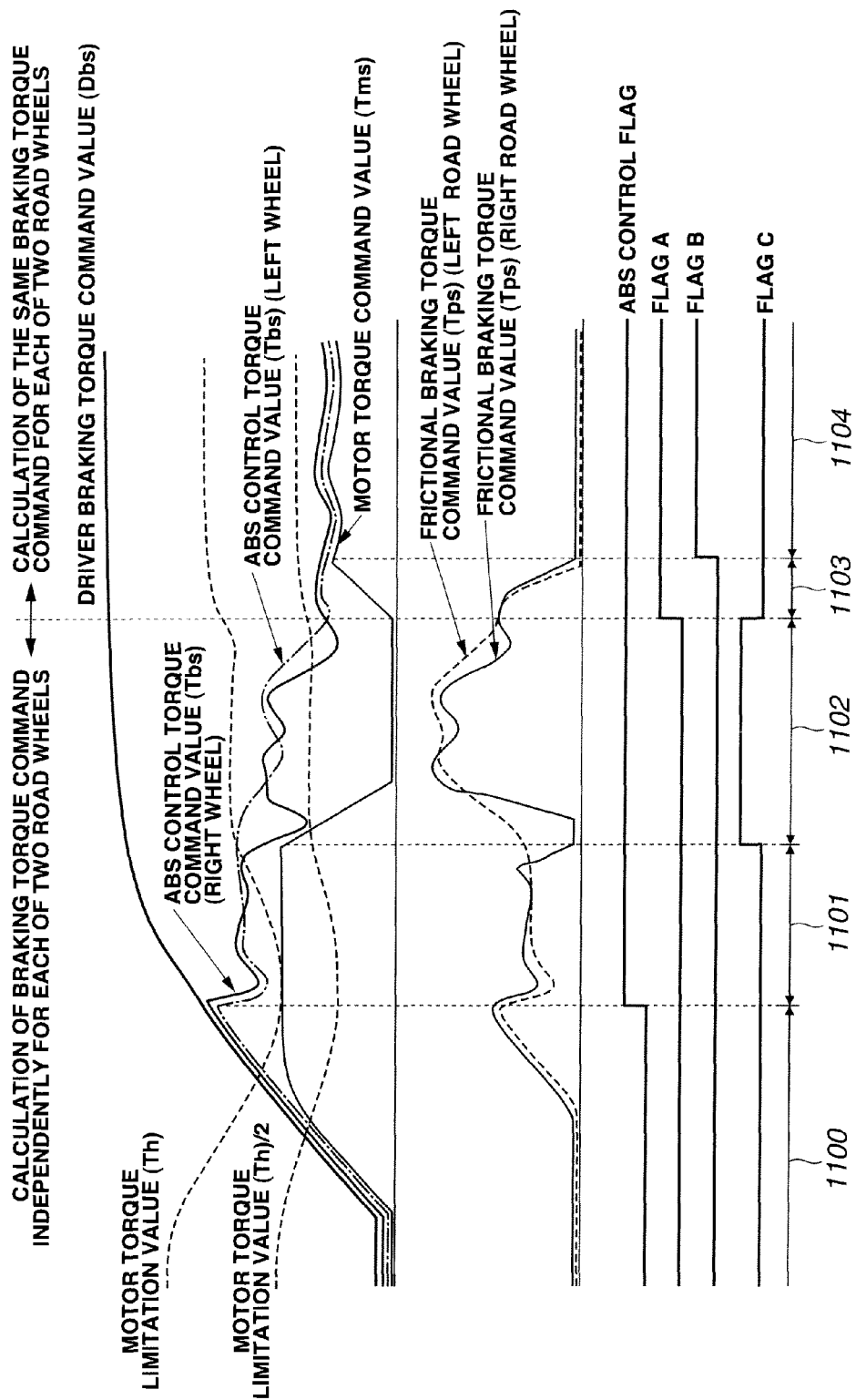
FIG. 12 is a timing chart representing an operation example in which a control state is transferred from a control state requesting different braking torque variation quantities for the respective left and right drive road wheels in the ABS control and to another control state requesting the same braking torque variation quantity for each of the left and right road wheels in the case of the preferred embodiment.

FIG. 12 shows a timing chart representing an operation example in a case of the ABS control where the control state is transferred from the control state in which the independently different braking torque variation quantities are requesting for the respective left and right road wheels to the control state in which the same braking torque variation quantity is requesting for each of the left and right road wheels.

In a region 1100, the motor torque command value (Tms) is limited within a range of both of the motor torque command variation quantity limitation value (a, b) calculated at the motor torque command limitation value calculation section 202 in FIG. 2 and the motor torque command limitation value (Th). Then, the difference between the ABS braking torque command limitation value (Tbs) and the motor torque command value (Tms) is set as the frictional braking torque command value.

In a region 1101, the ABS control is started (the ABS control flag is set to true) and the ABS braking torque command value (Tms) is decreased but does not become equal to or below the motor torque command value (Tms). Then, the determination at step S723 in FIG. 8 indicates No. The motor torque command value (Tms) is held and the ABS braking torque command variation quantity (dTbs) is satisfied according to the frictional braking torque.

In a region 1102, the ABS braking torque command value (Tbs) is equal to or below the motor braking torque command value. Thus, the determination at step S723 in FIG. 8 gives Yes. The motor torque command value (Tms) is decreased in accordance with step S720 in FIG. 8. At this time, the motor torque command value (Tms) is held to be reduced. The ABS braking torque command variation quantity (dTbs) is satisfied according to the frictional braking torque. Once the motor torque command value (Tms) is reduced, the frictional braking torque command value (Tps) is increased in place thereof. When an increase width thereof is large, a pump drive quantity is accordingly large and disadvantageous in terms of a sound-and-vibration suppression performance. However, after the frictional braking torque command value (Tps) is once increased, a fine adjustment is only made and it is not necessary to drive the pump. Thus, the motor torque command value (Tms) is held to be reduced and the sound-and-vibration suppression performance can be improved.

In a region 1103, the state becomes the control state in which the same braking torque variation quantity for each of the left and right road wheels is requested in the ABS control and the determination at step S711 in FIG. 8 indicates Yes. Thereafter, the motor torque command is increased in accordance with step S717 in FIG. 8. If the motor torque command value becomes equal to or larger than the predetermined value (Th2) which is equal to or below the motor torque command limitation value (Th), the state becomes the control state in which the ABS braking torque variation quantity (dTbs) is satisfied by the motor torque.

As described above, the following actions and advantages can be obtained from the braking control apparatus in the preferred embodiment.

(1) The braking control apparatus in the preferred embodiment comprises: electric motor 100 which provides the electrical braking torque for the road wheels connected thereto via the drive train on a basis of the calculated motor torque command value; the frictional braking device which provides the frictional braking torque for the road wheels on a basis of the calculated frictional braking toque command value; the motor-or-frictional braking toque command determining section 203 (the target braking torque command value calculation section) which calculates the target braking torque command value on a basis of the braking request by the driver or the state of the road wheels; the frequency component decomposition section which decomposes the target braking torque command value into the first frequency component which does not include the resonance frequency of the drive train and the second frequency component which is equal to or higher than the first frequency component including the resonance frequency of the drive train; and the braking force control section which provides the electrical braking torque for the road wheels on the basis of the motor torque command value corresponding to the first frequency component and provides the frictional braking torque on a basis of the frictional braking torque command value corresponding to the second frequency component. Thus, since the brake by means of electric motor 100 is used at the frequency equal to or lower than the resonance frequency, the sound-and-vibration (suppression) performance can be improved. That is to say, in a case where the frictional braking torque is given, the drive of the pump and the operation of the electromagnetic valve are involved. Then, the sound or the vibration according to the operation quantity is generated. On the other hand, in a case where the vibration torque is given according to electric motor 100, the drive of the pump and the operation of the electromagnetic valve are not involved. Thus, the electric motor itself does not provide the source of the noises and the vibrations. However, a drive shaft linking between electric motor 100 and drive wheels is twisted so that the resonance occurs in a relationship between the twist and the revolution state of the road wheels and provides the source of the vibrations.

Whereas, electric motor 100 takes charge for the first frequency component which does not include the resonance frequency of the drive train to prevent the vibrations in the drive train. Then, since no additional charge is needed for the braking torque, the motor torque can widely be reduced by the operation of the electromagnetic valves.

(2) Motor-or-frictional braking torque determining section 203 (the target torque command value calculation section) determines the motor drive torque or the frictional braking torque on a basis of the input of the ABS braking torque command calculation section 201 (the antilock target braking torque command value calculation section) which suppresses the slip state according to the slip state of the road wheels. Thus, the sound-and-vibration suppression performance can be improved during the ABS control. During the ABS control, the revolution state of the road wheels is controlled so that the frictional force between the road surface and the road wheels becomes large. That is to say, the increase or decrease of the road wheel speeds is carried out with a predetermined slip rate as a boundary. In this way, even if the road wheel speeds are vibrated, the generation of the sound or the vibration can be suppressed.

(3) In the braking control apparatus for the electric vehicle as set forth in the above-described item (2), the first frequency component is a frequency component approximately equal to or lower than half the resonance frequency of the drive train. Thus, the motor drive can be operated for the resonance frequency of the drive train with a great margin. The motor brake is not easy to enter and the sound-and-vibration suppression performance can be improved.

(4) In the braking control apparatus for the electric vehicle as set forth in the above-described item (2), the drive train includes a differential gear 105 (differential unit) connected to an output shaft of electric motor 100 and a wheel axle 106 connected between differential gear 105 and road wheels of a pair of left and right road wheels $W_{RL}$, $W_{RR}$. That is to say, even though a one motor system in which the single electric motor drives the plurality of the road wheels, the frictional braking device can control left and right road wheels $W_{RL}$, $W_{RR}$ independently according to the frictional braking device. In addition, since the resonance does not occur even through the drive train having the gear, the sound-and-vibration suppression performance can be improved along with a backlash.

(5) In the braking control apparatus for the electric vehicle as set forth in above-described item (4), in a case where the ABS braking torque command values calculated at ABS braking torque command value calculation section 201 are different for the pair of left and right road wheels $W_{RL}$, $W_{RR}$, the motor torque command value is held until the ABS braking torque command value for one of left and right road wheels becomes equal to or below the motor torque command value corresponding to the first frequency component and the motor torque command value is decreased when one of the ABS braking torque command values for one of the left and right road wheels $W_{RL}$, $W_{RR}$ becomes equal to or below the motor torque command value corresponding to the first frequency component.

Thus, the frictional braking device is once operated according to the pump. Thereafter, the frictional braking device is used. Hence, excessive drive executions and stops for the pump are not repeated and this is applied during the left and right road wheel independent control so that the further sound-and-vibration suppression performance can be improved.

(6) In the braking control apparatus for the electric vehicle as set forth in above-described item (5), the frictional braking torque command value is increasingly generated which corresponds to the decrease in the motor torque command value in a form of the ABS braking torque command value. Thus, the desired ABS braking torque command value can be obtained.

(7) In the braking control apparatus for the electric vehicle as set forth in above-described item (4), the pair of left and right road wheels are rear road wheels of the electric vehicle.

In this way, even in a case where the present invention is applicable to the rear-drive vehicle, the stability of a vehicular motion can be more remarkably improved.

(8) In the braking control apparatus for the electric vehicle as set forth in item (1), the vehicle comprises: high-voltage battery 107 which is mounted in the vehicle and charges a power regenerated by means of electric motor 100; battery controller 108 (SOC detection section) which detects the SOC of high-voltage battery 107; and motor winding temperature sensor and inverter element temperature sensor (the temperature detection section) detecting the temperatures of the coil of electric motor 100 and of inverter element driving the electric motor. In a case where the SOC related motor torque command value based on the detection result by battery controller 108 or the temperature related motor torque command value based on the detection result of the temperature sensors is smaller than the motor torque command value, the electrical braking torque can be given according to a minimum command value from among the respective related motor torque command values. Thus, an appropriate motor torque command value by which a load is not applied to component parts can be obtained.

(9) The braking control apparatus for the electric vehicle comprises: electric motor 100 which provides the electrical braking torque for the wheels connected via at least wheel axle as the drive train on the basis of the calculated motor torque command value; the frictional braking device which provides the frictional braking torque for the road wheels on a basis of the calculated frictional braking torque command value; the motor-or-frictional braking torque command determining section 203 (the target braking torque command value calculation section) which calculates the target braking torque command value on a basis of the state of the road wheels; and a control unit which operates the electric motor and the frictional braking device with the difference between the target braking torque command value and the motor torque command value as the frictional torque command value and with the command value of the frequency component lower than the resonance frequency of the drive train as the motor torque command value. Thus, since the brake by means of electric motor 100 is used at the frequency equal to or below the resonance frequency of the drive train, the sound-and-vibration suppression performance can be improved.

(10) In the braking control apparatus for the electric vehicle as set forth in item (9), motor-or-frictional braking torque command determining section 203 determines the motor braking torque command or the frictional braking torque command on a basis of the input of the ABS braking torque command calculation section 201 (antilock target braking torque command value calculation section) which suppresses the slip state in accordance with the slip state of the road wheels. Thus, the sound-and-vibration suppression performance during the ABS control can be improved.

(11) In the braking control apparatus for the electric vehicle as set forth in above-described item (10), wheel axle 106 serves to connect the pair of left and right road wheels via differential gear 105. That is to say, even though the one motor system in which the single motor drives the plurality of wheels, the frictional braking device can independently control both of left and right road wheels. In addition, since no resonance occurs even in the drive train via the gear, the sound-and-vibration suppression performance along with the backlash can be improved.

(12) In the braking control apparatus as set forth in above-described item (11), in a case where the ABS braking torque command value calculated at the ABS braking torque command value is different for each of the left and right road wheels, the motor torque command value is held until one of the left and right ABS braking torque command values becomes equal to or below the motor torque command value corresponding to the first frequency component and the motor torque command value is decreased when one of the ABS braking torque command values for the left and right road wheels corresponding to the first frequency component.

Hence, if the frictional braking device is once operated according to the pump and, thereafter, the frictional braking device is, thereafter, used, no repetition of excessive execution and stop of the driving of the pump is carried out. This applies to the left and right independent control so that the sound-and-vibration suppression performance can be improved.

(13) In the braking control apparatus for the electric vehicle as set forth in above-described item (12), the frictional braking torque command value is increasingly generated in a form of the ABS braking torque command value which corresponds to the decrease in the motor torque command value. Thus, the desired ABS braking torque command value is obtained.

(14) In the braking control apparatus for the electric vehicle as set forth in above-described item (12), the first frequency component is a frequency component equal to or below approximately half (1~2Hz) the resonance frequency of the drive train. Thus, the motor brake can be operated with the great margin for the resonance frequency of the drive train. The motor brake is difficult to enter the resonance region and the sound-and-vibration suppression performance can be improved.

(15) In the braking control apparatus for the electric vehicle as set forth in above-described item (9), high-voltage battery 107 which is mounted in the vehicle and charges the electric power regenerated by means of electric motor 100; battery controller 108 (SOC detection section) which detects the SOC of high voltage battery 107; motor winding temperature sensor and inverter element temperature sensor (temperature detection section) which detects the coil temperature of electric motor 100 and the temperature of inverter element; the electrical braking torque is given according to the minimum command value from among the respective related motor torque command values in a case where the SOC related motor torque command value based on the detection result of battery controller 108 or the temperature related motor torque command value based on the detection result of the temperature sensors is smaller than the motor torque command value. Thus, an appropriate motor torque command value which does not impose a load on the component parts can be obtained.

(16) The braking control apparatus for the electric vehicle comprises: the pair of road wheels $W_{RL}$, $W_{RR}$ to which the output shaft of electric motor 100 is connected via differential gear 105 (differential unit) and wheel axle 106; electric motor 100 which provides the frictional braking torque for the road wheels on a basis of the calculated frictional braking torque; the ABS braking torque command calculation section 201 (the antilock target braking torque command value calculation section) which calculates the braking torque to suppress the slip of the road wheels and calculates the same braking torque command value for each of the pair of road wheels $W_{RL}$ and $W_{RR}$ in accordance with a state of the vehicle; the motor torque command value calculation section which calculates the motor torque command value which corresponds to the resonance frequency equal to or below the twist resonance frequency of the wheel axle; and motor-or-frictional braking torque command determining section 203 (braking force control section) which increases or decreases the braking torque acted upon the frequency so as to become equal to the calculated ABS braking torque command value (the antilock target braking torque command value), provides the braking torque on a basis of the motor torque command value when the ABS braking torque command value is equal to or below the limited motor torque command value, and controls the frictional braking device with the braking torque of the difference between the ABS braking torque command value and the motor torque command value as the frictional braking torque in a case where the ABS braking torque command value is larger than the limited motor torque command value. Thus, an operation frequency of the frictional braking device can be reduced and the sound-and-vibration suppression performance can be improved.

(17) In the braking control apparatus as set forth in the above-described item (16), the resonance frequency component is a frequency component approximately half (1~2 Hz) or below the resonance frequency of the drive train. Hence, the motor brake can be operated for the resonance frequency of the drive train with a great margin. The motor brake is difficult to enter the resonance region and the sound-and-vibration suppression performance can be improved.

(18) In the braking control apparatus for the electric vehicle as set forth in above-described item (17), the motor torque command value is held until the ABS braking torque command value for one of the left and right road wheels $W_{RL}, W_{RR}$ becomes equal to or below the motor torque command value which corresponds to the resonance frequency component equal to or below the twist resonance frequency of the wheel axle and the motor torque command value is decreased when the ABS braking torque command value becomes equal to or below the motor torque command value corresponding to the resonance frequency component equal to or below the twist resonance frequency of the wheel axle.

Hence, since the frictional braking device is once operated according to the pump and, thereafter, the frictional braking device is used, the excessive repetition of the execution and stop of the drive of the pump is eliminated and this is applied to the left and right road-wheel independent control so that the further sound-and-vibration suppression performance can be improved.

(19) In the braking control apparatus for the electric vehicle as set forth in above-described item (18), motor-or-frictional braking torque command determining section 203 generates the ABS braking torque command value by increasing the frictional braking torque command value corresponding to the decrease of the motor torque command value. Thus, the desired ABS braking torque command value is obtained.

(20) In the braking control apparatus for the electric vehicle as set forth in above-described item (19), high-voltage battery 107 which charges the regenerated power by means of electric motor 100; battery controller 108 (SOC detection section) which detects the SOC of high voltage battery 107; and motor winding temperature sensor and inverter element temperature sensor (temperature detection section) which detect the coil of electric motor 100 are provided and, in a case where the SOC related motor torque command value based on the detection result by means of battery controller 108 or the temperature related motor torque command value based on the detection result of the temperature sensors is smaller than the motor torque command value, the electrical braking torque is given by the minimum command value from the respectively related motor torque command values.

Thus, the appropriate torque which does not impose the load on the component parts can be obtained.

This application is based on a prior Japanese Patent Application No. 2009-287256 filed in Japan on Dec. 18, 2009. The entire contents of this Japanese Patent Application No. 2009-287256 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A braking control apparatus for an electric vehicle, comprising:
    an electric motor configured to provide an electrical braking torque for road wheels connected thereto via a drive train on a basis of a calculated motor torque command value;
    a frictional braking device configured to provide a frictional braking torque for the road wheels on a basis of a calculated frictional braking torque command value;
    a target braking torque command value calculation section configured to calculate a target braking torque command value on a basis of at least one of a state of the road wheels and a braking request by a vehicle driver;
    a frequency component decomposition section configured to decompose the target braking torque command value into a first frequency component lower than a resonance frequency of the drive train and a second frequency component equal to or higher than the first frequency component; and
    a braking force control section configured to provide the electrical braking torque for the road wheels on a basis of the motor torque command value corresponding to the first frequency component and to provide the frictional braking torque for the road wheels on a basis of the frictional braking torque command value corresponding to the second frequency component.

2. The braking control apparatus for the electric vehicle as claimed in claim 1, wherein the target braking torque command value calculation section includes an antilock target braking torque command value calculation section configured to suppress a slip state in accordance with the slip state of the road wheels.

3. The braking control apparatus for the electric vehicle as claimed in claim 2, wherein the first frequency component is a frequency component equal to or below an approximately half of a resonance frequency of the drive train.

4. The braking control apparatus for the electric vehicle as claimed in claim 1, wherein the drive train comprises a differential unit connected to an output shaft of the electric motor and a wheel axle connected between the differential unit and the left and right road wheels.

5. The braking control apparatus for the electric vehicle as claimed in claim 4, wherein the braking force control section holds the motor torque command value until an antilock target braking torque command value for one of the left and right road wheels becomes equal to or below the motor torque command value corresponding to the first frequency component, in a case where the antilock target braking torque command values calculated by the antilock target braking torque command value calculation section are different for the respective left and right road wheels and decreases the motor torque command value when the antilock target braking torque command value for one of the left and right road wheels becomes equal to or below the motor torque command value corresponding to the first frequency component.

6. The braking control apparatus for the electric vehicle as claimed in claim 5, wherein the braking force control section increasingly generates the frictional braking torque command value corresponding to a decrease of the motor torque command value in a form of the antilock braking torque command value.

7. The braking control apparatus for the electric vehicle as claimed in claim 4, wherein the pair of left and right road wheels is rear road wheels of the vehicle.

8. The braking control apparatus for the electric vehicle as claimed in claim 1, wherein the braking control apparatus further comprises: a battery mounted in the vehicle and configured to charge a power regenerated by means of the electric motor; an SOC detection section configured to detect an SOC of the battery; and a temperature detection section configured to detect temperatures of a coil of the electric motor and an inverter driving the electric motor, and wherein, in a case where an SOC related motor torque command value based on a detection result of the SOC detection section or a temperature related motor torque command value based on a detection result of the temperature detection section is smaller than the motor torque command value, the electrical braking torque is given according to a minimum command value from among the respective related motor torque command values.

9. A braking control apparatus for an electric vehicle, comprising:
an electric motor which provides at least an electrical braking torque for road wheels connected thereto via a wheel axle in a form of a drive train on a basis of a calculated motor torque command value; a frictional braking device configured to provide a frictional braking torque for the road wheels on a basis of the calculated frictional braking torque command value; a target braking torque command value calculation section configured to calculate a target braking torque command value on a basis of a state of the road wheels or a braking request by a vehicle driver; and a control unit configured to operate the electric motor and the frictional braking device according to the motor torque command value which is a command value of a frequency component lower than a resonance frequency of the drive train and the frictional torque command value which is a difference between the target braking torque command value and the motor torque command value.

10. The braking control apparatus for the electric vehicle as claimed in claim 9, wherein the target braking torque command value calculation section is provided with an antilock target braking torque command value calculation section configured to suppress a slip state in accordance with the slip state of the road wheels.

11. The braking control apparatus for the electric vehicle as claimed in claim 10, wherein the wheel axle serves to connect a pair of left and right road wheels via the differential unit.

12. The braking control apparatus for the electric vehicle as claimed in claim 11, wherein the braking force control section holds the motor torque command value until the antilock target braking torque command value for one of the pair of left and right road wheels becomes equal to or below the motor torque command value corresponding to a first frequency component in a case where the antilock target braking torque command value calculated by the antilock target braking torque command value calculation section is different for each of the left and right road wheels for one of the pair of left and right road wheels and decreases the motor torque command value when the antilock target braking force command value becomes equal to or below the motor torque command value corresponding to the first frequency component.

13. The braking control apparatus for the electric vehicle as claimed in claim 12, wherein the braking force control section increasingly generates the frictional braking torque command value corresponding to the motor torque command value in a form of the antilock braking torque command value.

14. The braking control apparatus for the electric vehicle as claimed in claim 12, wherein the first frequency component is a frequency component approximately half or below the resonance frequency of the drive train.

15. The braking control apparatus for the electric vehicle as claimed in claim 9, wherein the braking control apparatus further includes: a battery mounted in the vehicle and configured to charge an electric power regenerated by means of the electric motor; an SOC detection section configured to detect an SOC of the battery; and a temperature detection section configured to detect temperatures of a coil of the electric motor and an inverter driving the electric motor, wherein, in a case where an SOC related motor torque command value based on a detection result by means of the SOC detection section or a temperature related motor torque command value based on a detection result by means of a detection result of the temperature detection section is smaller than the motor torque command value, an electrical braking torque is given according to a minimum value from among the respective related motor torque command values.

16. A braking control apparatus for an electric vehicle, comprising:
a pair of left and right road wheels to which an output shaft of an electric motor is connected via a differential unit and via a wheel axle;
an electric motor configured to provide an electrical braking torque for the pair of road wheels on a basis of a calculated motor torque command value;
a frictional braking device configured to provide a frictional braking torque for the pair of left and right road wheels on a basis of the calculated frictional braking torque command value;
an antilock target braking torque command value calculation section configured to detect a slip state of the pair of left and right road wheels, to calculate the braking torque suppressing a slip of the road wheels, and to calculate the same braking torque command value for each of the pair of road wheels in accordance with a state of the vehicle;
a motor torque command value calculation section configured to calculate a motor torque command value corresponding to a resonance frequency equal to or below a twist resonance frequency of the wheel axle;
a braking force control section configured to increase or decrease the braking torque acted upon the pair of left and right road wheels to provide a calculated antilock target braking torque command value, to provide the braking torque on a basis of the motor torque command value when the antilock target braking torque is equal to or below the motor torque command value, and to control the frictional braking device with a driving torque of a difference between the antilock braking torque command value and the motor torque command value in a form of the frictional braking torque, in a case where the antilock braking torque command value is larger than a limited motor torque command value.

17. The braking control apparatus for the electric vehicle as claimed in claim 16, wherein the resonance frequency is a component frequency component approximately equal to half or below a resonance frequency of the drive train.

18. The braking control apparatus for the electric vehicle as claimed in claim 17, wherein the braking force control section holds the motor torque command value until the antilock target braking torque command value for one of the pair of road wheels becomes equal to or below the motor torque command value corresponding to the resonance frequency equal to or below the twist resonance frequency of the wheel axle, in a case where the antilock target braking torque command value calculated at the antilock target braking torque command calculation section is different for each of the pair of left and right road wheels, and decreases the motor torque command value when the antilock target braking torque command value for one of the pair of road wheels has become equal to or below the motor torque command value corresponding to the resonance frequency equal to or below the twist resonance frequency of the wheel axle.

19. The braking control apparatus for the electric vehicle as claimed in claim 18, wherein the braking force control section increasingly generates the frictional braking torque command value corresponding to the decrease of the motor torque command value as the antilock braking torque command value.

20. The braking control apparatus for the electric vehicle as claimed in claim 19, wherein the braking control apparatus further comprises:
a battery mounted in the vehicle and configured to charge an electric power regenerated by means of an electric motor;
an SOC detection section configured to detect an SOC of the battery; and a temperature detection section configured to detect temperatures of a coil of the electric motor and an inverter driving the electric motor, wherein the electrical braking torque is given according to a minimum command value from among respective related motor torque command values in a case where an SOC related motor torque command value based on a detection result of the SOC detection section or a temperature related motor torque command value based on a detection result of the temperature detection section is smaller than the motor torque command value.

\* \* \* \* \*